US011695770B2

(12) United States Patent
Pognant

(10) Patent No.: US 11,695,770 B2
(45) Date of Patent: Jul. 4, 2023

(54) METHOD FOR CONFIGURING REMOTE ACCESS CONTROLLING, AND SUPERVISING AT LEAST ONE HOME AUTOMATION DEVICE BELONGING TO A HOME AUTOMATION INSTALLATION

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 653 days.

(21) Appl. No.: 16/473,568

(22) PCT Filed: Dec. 21, 2017

(86) PCT No.: PCT/FR2017/053775
§ 371 (c)(1),
(2) Date: Mar. 31, 2020

(87) PCT Pub. No.: WO2018/122509
PCT Pub. Date: Jul. 5, 2018

(65) Prior Publication Data
US 2020/0233388 A1 Jul. 23, 2020

(30) Foreign Application Priority Data
Dec. 28, 2016 (FR) ...................................... 16/63453

(51) Int. Cl.
*H04L 9/40* (2022.01)
*H04L 12/28* (2006.01)
(Continued)

(52) U.S. Cl.
CPC .......... *H04L 63/10* (2013.01); *H04L 12/2818* (2013.01); *H04L 12/2825* (2013.01);
(Continued)

(58) Field of Classification Search
CPC ......... H04L 9/32–3234; H04L 12/2803–2838; H04L 29/06755–06795;
(Continued)

(56) References Cited

U.S. PATENT DOCUMENTS 5,944,794 A 8/1999 Okamoto et al.
9,946,857 B2 * 4/2018 Beals ...................... G06F 21/32
(Continued)

FOREIGN PATENT DOCUMENTS

CN 104038414 A 9/2014
CN 105245420 A 1/2016
(Continued)

OTHER PUBLICATIONS

Carles Gomez et al: "Wireless home automation networks: A survey of architectures and technologies", IEEE communications magazine, IEEE Service Center; vol. 48, No. 6, (Jun. 1, 2010).
(Continued)

*Primary Examiner* — Brendan Y Higa
(74) *Attorney, Agent, or Firm* — Cantor Colburn LLP

(57) ABSTRACT

The present invention relates to a method of remotely configuring access to at least one home automation device (D) that is part of a home automation installation (Su), the home automation installation comprising at least one home automation device (D) and at least one central control unit (U), and the method being performed by a first remote access service (Svc1) carried out by a management unit and comprising the following steps: receiving (ECfSvc19; ECfSvc14) a remote access request (MP, Min) relating to at least one home automation device (D) linked to the profile of a user (Usr1) and intended for a second service (Svc2), the request being relative to an identifier (UsrlID1) of the user (UsrlID1) with the first service (Svc1); receiving (ECfSvc16, ECfSvc19) an authorization in reply to the
(Continued)

access request by the user (Usr1); configuring (ECfSvc110) an access authorization repository so as to accept at least one control command (MCa) arriving from a second service (Svc2), or the transmission of monitoring data (MSa) to the second service (Svc2) for the home automation device (D) linked to the user profile (USr1). The invention also relates to a control and monitoring method.

15 Claims, 7 Drawing Sheets

(51) Int. Cl.
 *H04L 67/125* (2022.01)
 *H04L 67/51* (2022.01)

(52) U.S. Cl.
 CPC .......... *H04L 63/102* (2013.01); *H04L 67/125* (2013.01); *H04L 12/2836* (2013.01); *H04L 67/51* (2022.05); *H04L 2012/2841* (2013.01)

(58) Field of Classification Search
 CPC ..... H04L 29/06823–0685; H04L 63/08–0846; H04L 63/10–108; H04L 67/01; H04L 67/02; H04L 67/025; H04L 67/12–125; G16Y 20/00–40; G16Y 30/00–10; G16Y 40/00–60
 See application file for complete search history.

(56) References Cited

U.S. PATENT DOCUMENTS

| | | | |
|---|---|---|---|
| 10,075,334 | B1 | 9/2018 | Kozura et al. |
| 10,084,794 | B2* | 9/2018 | Goldfarb ............ G06F 21/6218 |
| 10,530,598 | B2* | 1/2020 | Ansari .................... H04L 63/20 |
| 10,645,089 | B2* | 5/2020 | Chung ................ H04L 63/0884 |
| 11,394,572 | B2 | 7/2022 | Pognant et al. |
| 2002/0180581 | A1* | 12/2002 | Kamiwada ............ H04L 63/083 340/5.2 |
| 2003/0051169 | A1* | 3/2003 | Sprigg .................... G06F 21/53 713/185 |
| 2007/0288487 | A1* | 12/2007 | Song ...................... H04L 63/101 |
| 2009/0320113 | A1* | 12/2009 | Larsen .................... H04L 63/08 709/227 |
| 2014/0159879 | A1 | 6/2014 | Rezvani et al. |
| 2015/0074259 | A1 | 3/2015 | Ansari et al. |
| 2015/0097689 | A1 | 4/2015 | Logue et al. |
| 2015/0037022 | A1 | 12/2015 | Dubman et al. |
| 2015/0370615 | A1* | 12/2015 | Pi-Sunyer .............. H05B 47/19 719/328 |
| 2016/0112262 | A1 | 4/2016 | Johnson et al. |
| 2016/0134432 | A1* | 5/2016 | Hund ...................... G05B 15/02 709/225 |
| 2016/0277413 | A1 | 9/2016 | Ajitomi et al. |
| 2017/0006471 | A1 | 1/2017 | Kim et al. |
| 2017/0063931 | A1* | 3/2017 | Seed ........................ H04L 67/12 |
| 2017/0346905 | A1 | 11/2017 | Pognant |
| 2018/0091355 | A1* | 3/2018 | Tamura ................. H04L 9/3213 |
| 2018/0270075 | A1 | 9/2018 | Cosserat et al. |
| 2019/0036721 | A1 | 1/2019 | Pognant et al. |
| 2019/0036727 | A1 | 1/2019 | Matson et al. |
| 2019/0052683 | A1 | 2/2019 | Logue et al. |
| 2019/0229985 | A1 | 7/2019 | Coote |
| 2019/0306144 | A1 | 10/2019 | Pognant |
| 2020/0021593 | A1 | 1/2020 | Pognant |
| 2020/0044884 | A1 | 2/2020 | Pognant |
| 2020/0125087 | A1 | 4/2020 | Wu |
| 2021/0056184 | A1* | 2/2021 | Modani .................. H04L 67/53 |
| 2021/0266326 | A1 | 8/2021 | Chen et al. |
| 2021/0336963 | A1 | 10/2021 | Rovito et al. |

FOREIGN PATENT DOCUMENTS

| | | |
|---|---|---|
| EP | 1260906 A1 | 11/2002 |
| EP | 2416600 A1 | 2/2012 |
| WO | 02093502 A1 | 11/2002 |
| WO | 2009080398 A1 | 7/2009 |
| WO | 2016038374 A1 | 3/2016 |

OTHER PUBLICATIONS

English Translation of the Written Opinion for Application No. PCT/FR2017/053773.
International Search Report for Application No. PCT/FR2017/053773.
International Search Report for Application No. PCT/FR2017/053774.
John Blackford et al: "TR-069 CPE WAN Management Protocol", pp. 1-228 (Jan. 8, 2014).
Written Opinion for Application No. PCT/FR2017/053773.
Written Opinion for Application No. PCT/FR2017/053774.
U.S. Non Final OA dated Apr. 30, 2021 for U.S. Appl. No. 16/473,571.
U.S. Non-Final Office Action dated May 13, 2021 for U.S. Appl. No. 16/473,565.
International Search Report for Application No. PCT/FR2017/053775.
Written Opinion for Application No. PCT/FR2017/053775.
Echonet Consortium: "-i- Echonet Lite Specification II Echonet Lite Communication Middleware Specification", Sep. 3, 2012, pp. 1-52.
English Translation First Office Action for CN Application No. 201780020699.X; dated Jan. 23, 2017; 8 Pages.
First Office Action for Application No. CN201780020699.X; 5 pages.
First Search for Application No. 201780020699.X.
International Search Report for Application No. PCT/FR2017/050134; dated Apr. 4, 2017; 6 Pages.
Written Opinion for Application No. PCT/FR2017/050134; dated Apr. 4, 2017; 16 Pages.
U.S. NonFinal Office Action dated Jun. 23, 2020, U.S. Appl. No. 16/073,274, filed Jul. 26, 2018; 10 pages.
U.S. NonFinal Office Action, dated Jan. 4, 2021, U.S. Appl. No. 16/073,274, filed Jul. 26, 2018; 13 pages.
U.S.Final Office Action dated Nov. 30, 2021, U.S. Appl. No. 16/473,565, filed Sep. 25, 2019; (26 pages).
U.S. Notice of Allowance dated Aug. 31, 2022, U.S. Appl. No. 16/473,565, filed Sep. 25, 2019; (11 pages).

\* cited by examiner

METHOD FOR CONFIGURING REMOTE ACCESS CONTROLLING, AND SUPERVISING AT LEAST ONE HOME AUTOMATION DEVICE BELONGING TO A HOME AUTOMATION INSTALLATION

CROSS REFERENCE TO RELATED APPLICATIONS

This application is a National Stage of PCT Application No. PCT/FR2017/053775 filed on Dec. 21, 2017, which claims priority to French Patent Application No. 16/63453 filed on Dec. 28, 2016, the contents each of which are incorporated herein by reference thereto.

FIELD OF THE INVENTION

The present invention concerns a method for configuring access, a method for controlling and a method for supervising at least one home automation device of a home automation installation.

PRIOR ART

A home automation installation of a building may comprise a plurality of home automation devices. It is known to proceed with the configuration, and with the monitoring, that is to say, with the control and/or the supervision of said installation by using a central control unit which communicates with one or several home automation device(s).

The users may wish to use third-party services to exploit the data generated by the home automation devices of the installation or enable a monitoring by third-party services.

Nonetheless, the heterogeneity of home automation devices and the management of access to each device aiming at ensuring the security of the home automation installation, make such an opening of the system difficult.

The present invention aims at solving all or part of the above-mentioned drawbacks.

DISCLOSURE OF THE INVENTION

To this end, the present invention concerns a method for configuring a remote access to at least one home automation device belonging to a home automation installation, the home automation installation comprising the at least one home automation device and at least one central control unit, the method being implemented by a first remote access service executed by a management unit and comprising the following steps of:
  Receiving a remote access request concerning at least one home automation device related to the profile of a user for the benefit of a second service, the request relating to an identifier of the user from the first service;
  Receiving an authorization of the access request by the user;
  Configuring an access right repository in order to approve at least one control order originating from a second service or the sending of supervision data to the second service on behalf of the home automation device related to the profile of the user.

Thanks to the arrangements according to the invention, a second service can obtain access to at least one home automation device belonging to a home automation installation in an easy manner while preserving a monitoring by the user, and without having to set up an infrastructure of access to the home automation device, via the first service.

According to one implementation, the remote access approval of the second service may be global for a given installation related to the user account of the user, or concern only a group of devices or a particular home automation device. In the same manner, this registration may concern all state variables or commands of a device, or concern a subset of the state variables or commands of a concerned device depending on a filtering.

According to one embodiment, the access right repository stores the correspondence between a second service and the authorized actions on resources of the first service. A resource may in particular comprise an identifier of a logical element of a home automation installation or a home automation device under the monitoring of the first service.

The scope or granularity of the access authorization may be predefined depending on the service concerned by the access request, or else by the emitter of the authorization. Different levels of granularity may be provided depending on the possibilities of the first service.

Thus a resource may consist of an entire installation or else a home automation device or a set of devices, or even one or several command(s) or function(s) or state variable(s) of a home automation device.

According to one embodiment, the second service proceed with the creation of an account for the user, with a corresponding identifier Usr1ID2, and can record the correspondence between the identifier Usr1ID1 of the user on the first service, and the identifier Usr1ID2 of the user on the second service, as well as the corresponding identification token.

According to one implementation, the second service then communicates to the first service a confirmation of the creation of the user account and optionally the created identifier Usr11D2.

In the context of the present invention, a state variable is an element describing the state of a home automation device. The value of a state variable may correspond to the ON/OFF condition for a switch, or to an opening degree or percentage for a shutter. Moreover, a state variable may correspond to a measurement value of a sensor, for example a value of a physical or environmental quantity. The description of the states of the devices may be generic or specific, depending on the local protocol. The identifiers of the state variables may be numeric or alphanumeric. The values of the state variables may use formats or scales which are customized or proprietary.

In the context of the present invention, a command corresponds to an order that may be given to a home automation device in order to carry out an action by this device or to obtain an information feedback, for example an information relating to a state variable of this device.

According to one implementation, the management unit executing the first service is a server remotely connected to the at least one home automation installation, via a wide area network. It should be noted that the term server is a logical designation which may cover the use of several physical servers to distribute the computer processing load to be carried out.

According to another aspect of the invention, the management unit executing the first service may be a central unit intended to be connected to one or several central control unit(s) on distinct private or local area networks, or else on the same local area network.

The management unit executing the second service is a server remotely connected to the management unit executing the first service. As before, the term server is a logical designation which may cover the use of several physical servers to distribute the computer processing load to be carried out.

In the context of the present invention, a home automation device is a home automation equipment and/or a sensor, or still a portion of a home automation equipment or a portion of a sensor corresponding to a functional subset. A home automation device may also correspond to a control point of other home automation devices.

In the context of the present invention, a message is an information element notified or received via a communication module from an external equipment, or in the form of a synchronous or asynchronous call, which may also correspond to a local or remote function call.

In the context of the present invention, an installation is a set comprising a plurality of home automation devices and at least one central control unit disposed on one single building or on a plurality of locations, each home automation device being related to a central control unit among the plurality of central control units, the plurality of central control units forming a group under the control of one user. The electronic devices form groups of at least one home automation device related to a central control unit.

In the context of the present invention, a central control unit of the home automation installation is an electronic unit comprising:
 at least one processing unit for containing and executing at least one computer program,
 at least one communication module intended to monitor and/or control at least one home automation device; and
 at least one module for communication with the management unit.

The electronic unit may be independent or integrated into a home automation device. In the latter case, the communication module intended to monitor and/or control the device may be a communication module internal to the home automation device and/or a communication module intended to monitor and/or control other home automation devices. In some applications, a central control unit may communicate with the management unit through an intermediate management unit, for example a third-party service provider, whose intermediate management unit provides a service interface or API.

The central control unit may also be integrated to a router and/or a modem achieving a connection to a wide area network, in particular the Internet.

In the context of the present invention, a first service corresponds to a user service intended for the monitoring of the home automation installation by an end user. The user service is a remotely accessible computerized service, which enables access to at least one monitoring or supervision function of a home automation installation or a home automation device, by means of a user interface. The user interface can be accessible through a graphical interface, or via a programming interface.

A second service corresponds to a third-party service, which is able to generate at least one remote instruction for carrying out at least one command for at least one home automation device of an installation or to process data originating from at least one home automation device.

The first service may be under the monitoring of a first entity and the second service may be under the monitoring of a second entity.

According to one implementation, the configuration step comprises a step of generating an identification token for the second service.

According to one implementation, the reception of an access request authorization will result in the generation of an identification token of the second service by the first service. This arrangement allows securely identifying requests originating from a second service. Thus, a second service, approved by a user associated with a home automation system managed by the first service and containing at least one home automation device, will have to provide the identification token in its query to the first service.

According to one implementation, the identification token is then transmitted to the second service, directly or via the emitter of the approval message.

According to one implementation, this identification token may be permanently valid or limited in time.

According to one implementation, this token will be stored in the access repository. This arrangement allows performing the correspondence with the authorizations on the resources.

According to one implementation, the remote access request is received from the second service.

According to one implementation, the remote access request can identify the user by the identifier Usr1ID1.

According to an implementation which corresponds to a first case, the user, via a user terminal, requests a registration to the second service directly from this second service. Thus, in this case, the user emits a registration request to this second service. In a simultaneous or distinct step, the user also transmits, to the second service, the identifier Usr1ID1 which identifies the user before the first service. The second service proceeds with the creation of an account for the user, with a corresponding identifier Usr1ID2.

According to one implementation, the method comprises the following step, prior to the step of receiving an authorization, consisting in:
 Requesting an approval or a confirmation of the access request for the benefit of the second service before the user.

According to one implementation, the user receives the approval request via his terminal.

According to one implementation, which corresponds to the first case, the user confirms his approval or authorization of the access request in a response which is received by the first service at a step distinct from the reception of the access request.

According to one implementation, the remote access request for the benefit of the second service is received from the user.

Thus, according to an implementation which corresponds to a second case, the user, via a user terminal, requests a registration with the second service via the first service. In this case, the step of receiving an access request and the approval step may be combined together.

According to one implementation, the method further comprises the following step of:
 Sending at least one message containing a list of available second services to the user or to a user terminal;
 The step of receiving a registration and approval request Min/Mac corresponds to a selection of a second service in the list of second services contained in the message.

According to one implementation, the method further comprises the following step, prior to the step of sending a message containing a list of the available second services, consisting in:
 Receiving a query message originating from the user in order to obtain a list of available second services from the first service.

According to one implementation, the method further comprises the following step of:

Sending an approval/registration message to the second service.

According to one implementation, the step of sending an approval/registration message to the second service by the first service is subsequent to the configuration step.

According to one implementation, the method comprises the following step of:

Sending at least one message for describing or transmitting a filtered view of the installation or a group of home automation devices comprising at least one device, to the second service.

According to one implementation, the method comprises an additional step of registering the second service as a subscriber for events concerning the at least one device.

The present invention also concerns a method for configuring a remote access to at least one home automation devices belonging to a home automation installation, the home automation installation comprising the at least one home automation device and at least one central control unit, the home automation installation being accessible by a first remote access service, the method being implemented by a second remote access service and comprising the following steps of:

Receiving an authorization of an access request by the user; the remote access request concerning at least one home automation device related to the profile of a user for the benefit of a second service;

Configuring a profile or an account for the user on the second service and recording a correspondence between an identifier of the user on the first service, and the identifier of the user on the second service.

According to one implementation, the remote access request can identify the user by the identifier Usr1ID1.

According to one implementation which corresponds to a first case, the user, via a user terminal, requests registration to the second service directly from this second service. Thus, in this case, the user emits a registration request to this second service Svc2. At a simultaneous or distinct step, the user also transmits the identifier Usr1ID1, which identifies the user before the first service, to the second service. The second service proceeds with the creation of an account for the user Usr1, with a corresponding identifier Usr1ID2.

According to a second case, the registration to the second service is requested from the first service.

According to one implementation, the method comprises a step of receiving an identification token from the first service.

According to one implementation, the method comprises a step of recording an identification token with the first service in correspondence with a user profile or account. The present invention also concerns a method for configuring a remote access to at least one home automation device belonging to a home automation installation, the home automation installation comprising the at least one home automation device and at least one central control unit, the method being implemented by a first remote access service executed by a management unit and comprising the following steps of:

Receiving an information message concerning a presence of the home automation device originating from a central control unit to which the device is related;

Determining a second service associated with a type of the home automation device for which a remote access must be configured with corresponding access rules;

Configuring an access right repository in order to approve at least one control order originating from the second service or the sending of supervision data to the second service on behalf of the home automation device.

Thanks to the arrangements of the invention, a second service can easily obtain access to at least one home automation device belonging to a home automation installation while preserving a monitoring by the management unit, and without having to set up an infrastructure of access to the home automation device, via the first service.

According to one implementation, the access right repository may use calculation algorithms taking as input information on the device, the state variable and the second service (type, identifier and value) and outputting a Boolean result indicating whether access is authorized. These arrangements allow limiting the data stored in the repository by using logical rules for determining the authorizations for a given device and limiting the extensive searches in this repository, which allows improving the performances.

According to one implementation, the information message concerning the presence of the home automation device corresponds to the establishment of a connection between the central control unit and the home automation device and/or to the discovery of the home automation device by the central control unit. The connection is made via a network, in particular a home automation network. For example, this situation may correspond to the installation of a device by a user or an installer in a home automation installation and to the pairing or the discovery of the home automation device with a central control unit present in the installation, or else to the installation of a central control unit and the pairing or the discovery by this central control unit of a previously installed home automation device.

According to one implementation, the home automation device and/or the installation are related to a user profile or account on the first service. The user profile or account on the first service may be associated with an identifier Usr1ID1 of the user on the first service.

According to one implementation, the step of determining a second service associated with a type of the home automation device for which a remote access must be configured comprises a consultation of an access rules definition repository.

According to one implementation, the access rules definition repository may comprise at least one association between a type of home automation device, at least one second service and optionally access or filtering rules. The access rules definition repository, may be included in the access right repository or distinct therefrom, but accessible by the first service.

According to one implementation, the configuration step comprises a step of generating an identification token for the second service.

According to one implementation, the configuration method comprises the following step, prior to the configuration step, consisting in:

Requesting an access authorization for the benefit of the second service before the user.

According to one implementation, the user receives the request for approval via a terminal.

According to one implementation, which corresponds to the first case, the user confirms his approval or authorization of the access request in a response which is received by the first service.

According to one implementation, the configuration method comprises the following step of:

Sending an approval/registration message to the second service.

According to one implementation, the step of sending an approval/registration message to the second service by the first service is subsequent to the configuration step.

According to one implementation, the configuration method comprises the following step of:

Sending at least one message for describing or transmitting a filtered view of the installation or a group of home automation devices comprising at least one device, to the second service.

According to one implementation, the method comprises an additional step of registering the second service as a subscriber to events concerning the at least one device.

The present invention also concerns a method for configuring a remote access to at least one home automation device belonging to a home automation installation, the home automation installation comprising the at least one home automation device and at least one central control unit, the home automation installation being accessible by a first remote access service, the method being implemented by a second remote access service and comprising the following steps of:

Receiving an access authorization concerning at least one home automation device for the benefit of the second service;

Configuring a profile or an account for a user under the monitoring of whom, the home automation device is placed on the second service and recording a correspondence between an identifier of the user on the first service, and the identifier of the user on the second service.

According to one implementation, the remote access authorization can identify the user by the identifier Usr1ID1.

According to one implementation, the method comprises a step of receiving an identification token from the first service.

According to one implementation, the method comprises a step of recording an identification token from the first service in correspondence with a user profile or account.

The present invention also concerns a method for remotely controlling at least one home automation device belonging to a home automation installation, the home automation installation comprising the at least one home automation device and at least one central control unit, the method being implemented by a first remote access service executed by a management unit and comprising the following steps of:

receiving a control message concerning at least one command to be carried out on the at least one home automation device originating from a second service;

checking the authorization of the command requested in the message for the service before an access right repository;

in the case where the command is authorized for the second service, sending at least one control message to at least one central control unit to which the at least one home automation device, concerned by the command, is related.

According to one implementation, the check-up of the authorization consists in checking whether it concerns at least one home automation device for which remote access has been authorized, and/or if the concerned command or function is authorized for this home automation device for the second service.

According to one implementation, the token is obtained during a prior authorization step.

The format of the control message received by the first service may be distinct from that of the control message sent to the central control unit, a format conversion may be carried out by the first service.

According to one implementation, the central control unit emits a control message to the home automation device concerned by the command which receives it at one step. The format of this message may be distinct from that of the message, a format conversion may be carried out by the central control unit. According to one implementation, the home automation device then performs the command. The home automation device can communicate a feedback code or a result of the command in a feedback message to the central control unit.

According to one implementation, the control message concerning at least one command to be carried out on the at least one home automation device originating from a second service comprises an identification token; the method further comprises a step of checking the validity of the identification token for the service before the access right repository.

According to one implementation, the method further comprises the following steps of:

Receiving a feedback message originating from the central control unit to which the device is related.

checking the authorization of the sending of a feedback message for the command to the service before an access right repository;

in the case where the communication of the command feedback code is authorized for the second service, sending a feedback message to the second service.

According to one implementation, the check-up of the authorization consists in checking whether the feedback message concerns at least one home automation device for which remote access has been authorized, and/or whether the concerned command or function feedback code is authorized for this home automation device for the concerned second service.

According to one implementation, the format of this message sent to the second service may be distinct from that of the message communicated by the central control unit, a format conversion may be carried out by the first service.

According to one implementation, the control method comprises the steps of a configuration method as previously described.

The present invention also concerns a method for remotely controlling at least one home automation device belonging to a home automation installation, the home automation installation comprising the at least one home automation device and at least one central control unit, the home automation installation being accessible by a first remote access service, the method being implemented by a second remote access service and comprising sending of a control message concerning at least one command to be carried out on the at least one home automation device to the first service.

According to one implementation, the control message comprises an identification token.

The present invention also concerns a method for remotely supervising at least one home automation device belonging to a home automation installation, the home automation installation comprising the at least one home automation device and at least one central control unit, the method being implemented by a first remote access service executed by a management unit and comprising the following steps of:

Receiving a supervision message originating from a central control unit comprising information concerning at least one state variable of the at least one home automation device related to the central control unit.

Checking the authorization of the sending of a supervision message concerning the state variable of the home automation device to the second service before an access right repository;

In the case where the sending of the supervision message is authorized, Sending a supervision message to the second service.

According to one implementation, the check-up of the authorization consists in checking whether it concerns at least one home automation device for which a remote access has been authorized, and/or if the communication of data relating to the concerned state variable is authorized for this home automation device for the second service.

Thanks to the arrangements of the invention, a filtering on a type of state variable can be carried out, or even a filtering on value ranges of the state variable.

According to one implementation, the supervision message may correspond to an event of change in value of the state variable.

The format of the received message may be distinct from that of the sent message, a format conversion may be carried out by the first service.

The emission of the supervision message by the central control unit may be subsequent to the reception, by the central control unit, of a supervision message originating from the home automation device. This message may for example correspond to an event of change in value of the state variable.

According to one variant, in the case where the central control unit is integrated in the device, the constitution of the supervision message can be carried out locally upon the detection of the triggering event corresponding to the change in value of the state variable.

According to another variant, in the case where the central control unit is distinct from the device, it is also possible that the device periodically sends messages and that it is the central control unit which operates a check-up to identify the value changes. Finally, it is also possible that the supervision messages are sent to the first service without notice of any change in value.

The sending of the supervision message by the first service to the second service may correspond to a direct notification between the first service and the second service which corresponds to a direct sending. Nonetheless, other mechanisms may be used.

In particular, according to a first variant, a queuing mechanism may be implemented, the messages may be stored by the first service on the queue and asynchronously collected by the second service.

According to one implementation, the method comprises a step of checking the validity of the identification token for the service before the access right repository. Thus, if the token is not valid, in particular if the validity of the token has expired when the check-up is performed, no supervision message is sent to the second service. For example, it can also be provided that the token for a second service is invalidated by the first service if there is no longer any agreement between the first entity monitoring the first service and the second entity monitoring the second service or else if the user deletes his authorization to the second service. It is also possible that the token is invalidated after a predetermined period if the token is not renewed.

The present invention also concerns a method for remotely supervising at least one home automation device belonging to a home automation installation, the home automation installation comprising the at least one home automation device and at least one central control unit, the home automation installation being accessible by a first remote access service, the method being implemented by a second remote access service and comprising the reception of a supervision message originating from the first service comprising information concerning at least one state variable of a home automation device.

According to one implementation, the method comprises a local storage of the information relating to the state variables by the second service.

According to one implementation, the method further comprises the following step of:

storing information relating to the state variables by the first service.

According to one implementation, a filtering of the information is performed prior to the storage. This configuration is in particular useful in the case where the device is the property or under the monitoring of a second entity in charge of the second service, the first service and possibly the central control unit being under the monitoring of a first entity and acting as an infrastructure service.

According to one implementation, a local storage of information relating to the state variables can be carried out by the second service.

According to one implementation, the supervision method comprises the steps of a configuration method as previously described.

The different non-incompatible aspects defined hereinabove may be combined.

BRIEF DESCRIPTION OF THE FIGURES

The invention will be better understood from the detailed description which is exposed hereinafter with reference to the appended drawing in which.

DESCRIPTION WITH REFERENCE TO THE FIGURES

In the following detailed description of the figures defined hereinabove, the same elements or the elements filling identical functions may preserve the same references so as to simplify the understanding of the invention.

Description of a System Comprising a Home Automation Installation

Figure 1:
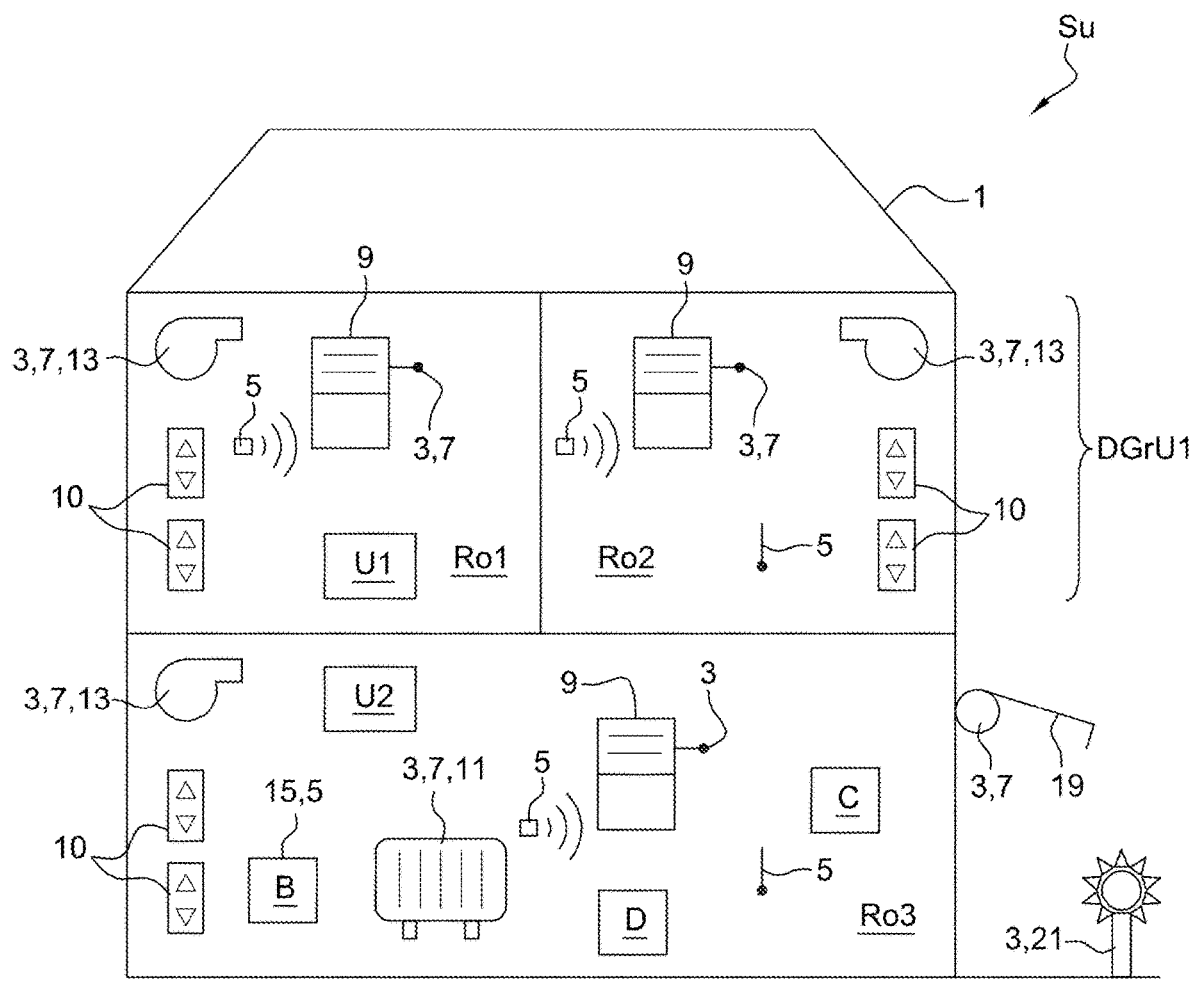
FIG. 1 is a schematic view of a building and a home automation installation in accordance with an embodiment of the invention.

As illustrated in FIG. 1, a building 1 comprises for example three rooms Ro1, Ro2, Ro3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation Su may also comprise a control point 15 an actuator 7, such as a wireless control box B for the rolling shutter 9.

The home automation installation Su may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s). The installation may also comprise one or several electric power consumption sensor(s).

A home automation equipment 3 and a sensor 5 should thus be considered as units having information on observed actual states of elements of the building 1 and being capable of sharing this information with other elements of the home automation installation Su.

The home automation equipment 3 and the sensors 5 can thus have access to any measurable physical unit, such as the temperature of each room Ro1, Ro2, Ro3 or a state of an element of the building 1, such as the open state of a rolling shutter 9, the state of an alarm, etc.

In the following, we will use the home automation device or device D designation indifferently to designate sensors or home automation equipment, or parts of home automation equipment 3 or sensors 5.

The home automation devices generally comprise a processing unit comprising a processor executing an embedded software. This software shall be updated to improve the functions thereof or proceed with corrections.

The home automation installation Su comprises one central control unit or a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation Su forming a group DGrU1, DGrU2. As example, in FIG. 1, the central control unit U1 is in charge of the devices D disposed in the rooms Ro1 and Ro2 of the first floor of the building, whereas the central control unit U2 is in charge of the devices D disposed in the room Ro3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

Figure 2:
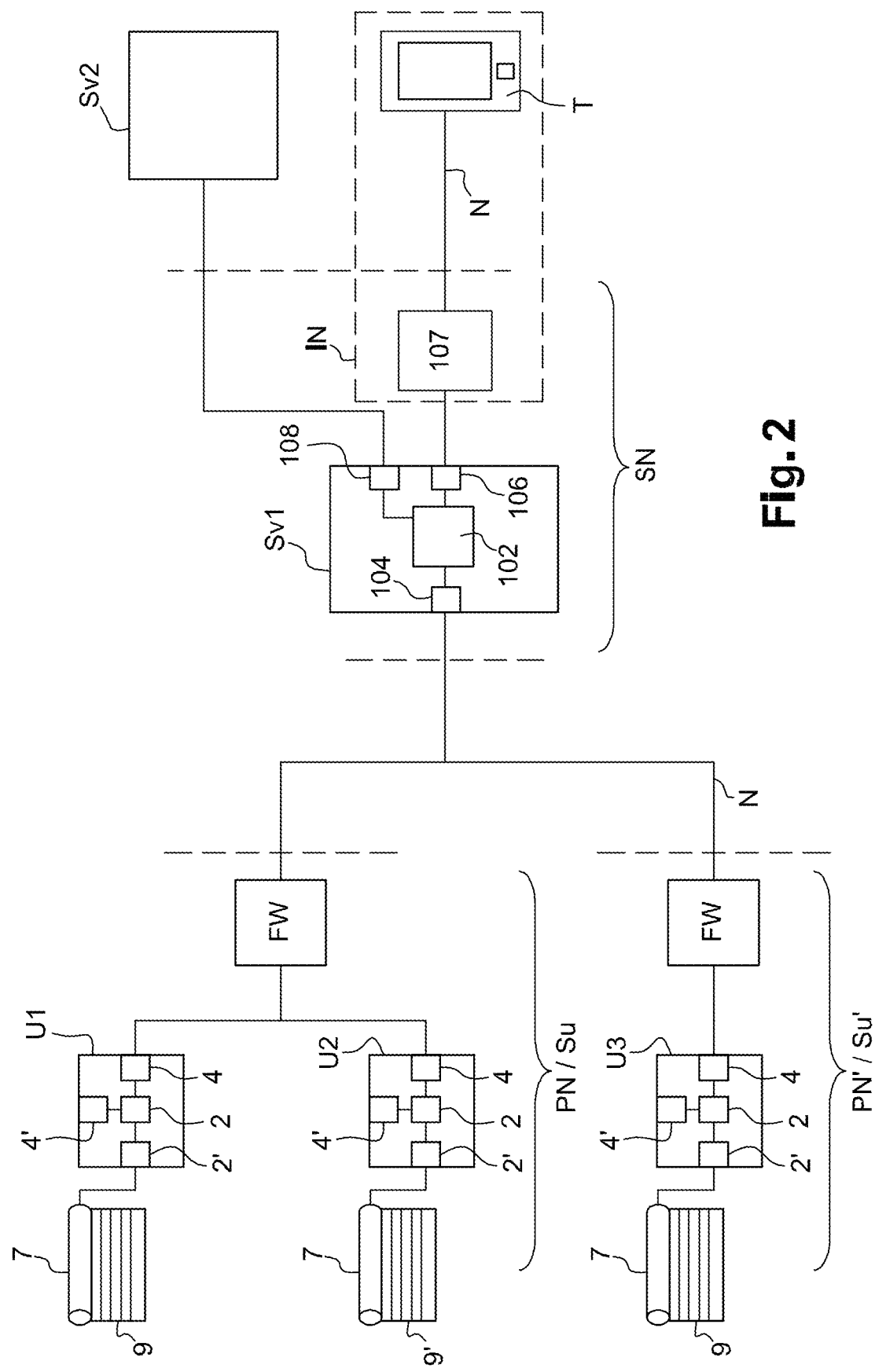
FIG. 2 is a diagram presenting an architecture of a system comprising the home automation installation illustrated in FIG. 1, a second home automation installation, as well as a server intended to be connected to a user terminal.

As represented in FIG. 2, each central control unit U is arranged to communicate with a server Sv1.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, while a third central control unit U3 is disposed on a second private network PN', independent from the private network PN corresponding to a second home automation installation Su'. The server Sv1 is also disposed on a private network SN. The private network PN is connected to a wide area network N, for example Internet. Of course, the server Sv1 is arranged to communicate with a set of such central control units U. We will in the following describe one of these units.

A central control unit U comprises a processing unit 2 arranged to contain and execute a first computer program. As example, the processing unit 2 comprises a processor, a storage flash memory as well as a random access memory, and an Ethernet chip.

The processing unit executes an embedded software. This software shall be updated to improve the functions thereof or proceed with corrections.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1, according to the local first communication protocol P1.

As example, the communication module 2' may be arranged to implement for example one or more of the local first protocols P1 such as for example Z-Wave, EnOcean, io-Homecontrol, Somfy RTS, KNX, MODBUS, Wavenis, Philips HUE. In general, these first local protocols are non-IP local communication protocols.

According to another possibility, for example in the context of alarm systems, the central control unit may be integrated into the home automation device. According to still another possibility, the central control unit may also be integrated to a router and/or a modem achieving a connection to a wide area network, in particular the Internet.

In the case where the central control unit is integrated into a home automation device, the communication module 2' intended for the monitoring and/or the control of the device may be a communication module internal to the home automation device and/or a communication module intended for the monitoring and/or the control of other home automation devices.

The reception of information from a sensor 5 providing information on the presence of a user or values of surrounding parameters, such as temperature, humidity and brightness, is also provided. In the same manner, the central unit U can enable the monitoring and/or the control of an alarm system.

Each central control unit U may further comprise a communication module 4' for communicating according to a target second communication protocol P2, with a mobile communication terminal T. The target second communication protocol may for example be a communication protocol above the protocol IP on a local area network, or else a generic point-to-point protocol. As example, the application protocol WEAVE using 6lowpan and thread transport protocols for a mesh network may constitute a target second protocol. Other examples include Bluetooth, Zigbee or Wifi.

The communication terminal T may contain and execute an application software APP.

Each central control unit U further comprises a module 4 for communicating with the server Sv1. The server Sv1 enables the remote control and/or monitoring and comprises one or several processing unit(s) 102 arranged to contain and execute a second computer program.

In some applications, a central control unit U may communicate with the server Sv1 through an intermediate server, for example a third-party service provider, whose intermediate server provides a service interface or API. In turn, the server Sv1 comprises at least one communication interface 104 intended for the communication with the central unit U.

The server Sv1 may also comprise a communication interface 106 intended for the communication with a control and/or monitoring interface IN enabling an end user Usr1 to remotely monitor the home automation installation, in particular via a user service Sv1c1.

It should be noted that the term server is a logical designation which may cover the use of several physical servers to distribute the computer processing load to be carried out.

For example, the control and/or monitoring interface IN comprises a web server 107 and a mobile communication terminal T1 communicating via the wide area network N. For example, the mobile communication terminal T1 may consist of a smartphone or a tablet. The mobile communication terminal T1 may be the same or a terminal of the same type as that with which the central control unit U locally communicates by means of the communication module 4', or a different terminal. We will designate these mobile terminals indifferently by the reference T1. Alternatively, the end user may also make use of a fixed terminal.

The control and/or monitoring interface IN1 comprises a processor which may be disposed at the level of the web server 107 and/or the mobile communication terminal T1.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

The server SV1 may also comprise a communication interface 108 intended for the communication with another server Sv2 under the responsibility of an entity other than that which operates the server Sv1 and which proposes at least one second service as will be described later on. This interface enables the communication between the two servers Sv1 and Sv2 on a local or wide area network, for example Internet.

Unique Identifier of a Home Automation Device

The server Sv1 and the central control units U may use a unique identifier to identify the home automation devices. The structure of a unique identifier of a home automation device DURL will now be described in connection with a particular embodiment.

According to this embodiment, the unique identifier of a home automation device comprises information on:

The local native protocol of the home automation device D,

The communication path to the device D, including the intermediate central control units U and the termination addresses to cross, whether organized or not in a hierarchical topology;

A subsystem identifier subsystemId if the device belongs to a group of devices D associated to the same address. The devices that are a unique expression of an address have no extension for identifying a subsystem.

Thus, the form of the unique identifier of a device DURL may be as follows:

<protocol>://<gatewayId>/<rawDeviceAddress>(#<subsystemId>)

Wherein the following fields are present:

protocol: identifier of the native device local protocol.

gatewayId: identifier of the first central control unit U, for example a serial number or a unique identifier.

rawDeviceAddress: a simple or multi-level path. Its meaning and its format depend on the addressing scheme of the local communication protocol of the device D.

subsystemId: this optional field indicates an identification, for example a rank of the subsystem (starting for example at 1), if such a subsystem is present.

EXAMPLES 1) knx://0201-0001-1234/1.1.3

This unique identifier DURL corresponds to a device D communicating by the KNX procotol with an individual address 1.1.3 accessible to the central control unit U carrying the identifier #0201-0001-1234.

2) io://0201-0001-1234/145036#2

This unique identifier DURL corresponds to a subsystem carrying the number 2 associated to a device D communicating by the io-Homecontrol protocol with a radio address 145036 accessible to the central control unit U carrying the identifier #0201-0001-1234.

First Service and Second Third-Party Service

Figure 3:
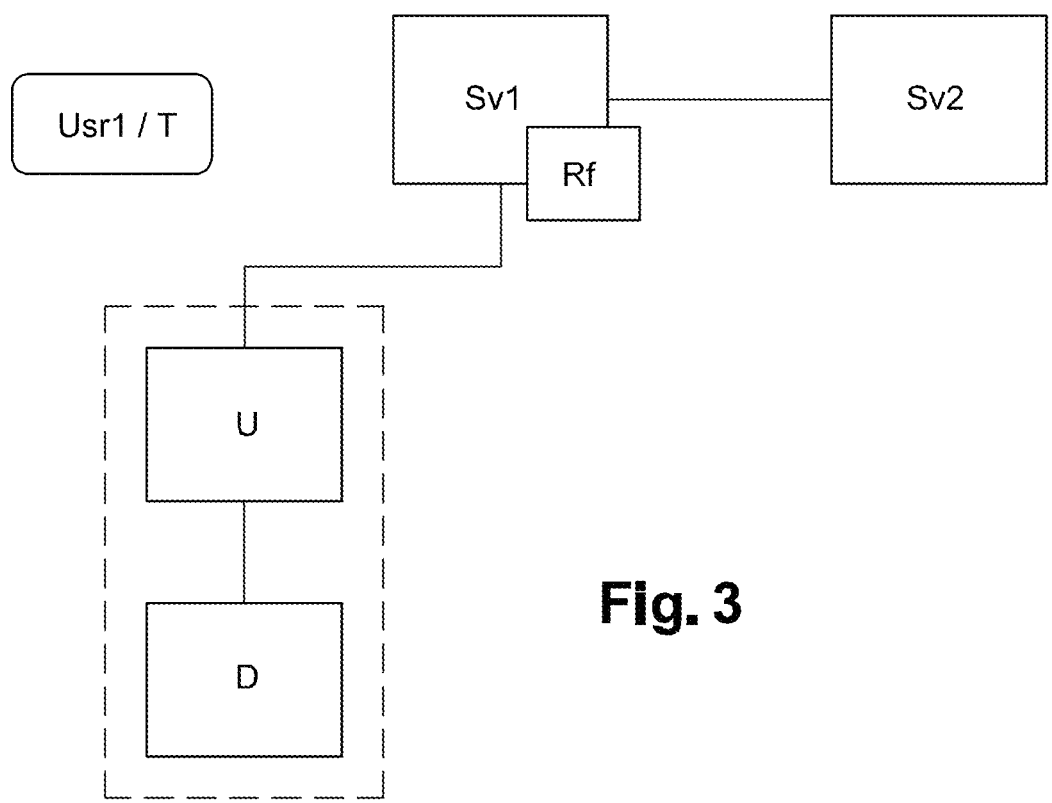
FIG. 3 is a diagram representing a server or a server group intended for the execution of a first remote access service and a second server or server group intended for the execution of a second remote access service.

The Server Sv1 or a Server group Sv1 hosts one or several software server(s) for providing services, as illustrated in FIG. 3.

In particular, a first service Svc1 corresponds to a user service intended for the remote monitoring of the home automation installation Su by an end user Usr1. The user service Svc1 is a remotely accessible computerized service, which enables access to at least one control or supervision function of a home automation installation or of a home automation device, by means of a user interface. The user interface can be accessed through a graphical interface, or via a programming interface.

A second service Svc2 corresponds to a third-party service, which is able to generate at least one remote instruction for carrying out at least one command for at least one home automation device D of an installation Su, or to process data originating from at least one home automation device D.

The first service Svc1 may be under the monitoring of a first entity and the second service Svc2 may be under the monitoring of a second entity. The second service can be considered as a partner service to which an access can be granted.

For example, the first entity may be a home automation installation infrastructure or management provider, and the second entity may be a service provider in connection with the data or the control of home automation devices. In particular, it is possible to consider an installation comprising a device D of the consumption sensor type, for example an electric power consumption sensor. The second service Svc2 can provide a consumption tracking feature that requires access to consumption data generated by the consumption sensor. For example, the second service may be a user service of a power supplier.

Access Right Repository and Identification Token

The first service Svc1 implements an access right repository Rf. The access right repository Rf stores the correspondence between a calling second service Svc2 and the authorized actions on resources Rc of the first service Svc1. A resource Rc is an identifier of a logical element of a home automation installation Su under the monitoring of the first service Svc1, possibly arranged to present different levels of granularity depending on the possibilities of the service Svc1. Thus, a resource Rc may consist of an entire installation St or a home automation device D or else a set of devices D, or even one or several command(s) C or function(s) or state variable(s) S of a home automation device D. According to a particular embodiment, the resources can be organized in a hierarchical manner using an access path type resource identifier corresponding for example to the device identifier DURL described previously, by possibly adding a complementary resource identifier Rc, or by defining intermediate levels corresponding to an access to several elements of the defined arborescence. Table 1 hereinbelow gives an example of a first data structure of the repository Rf.

TABLE 1

Example of a first data structure of the repository Rf

| Second Service Svc2 | Resources RC | Authorized Actions |
|---|---|---|
| Svc2 | setup/1234/sensors/temperature/* | READ |
| Svc2 | setup/1234/actuators/rollershutters/*/command/open | EXECUTE |

In this example of a repository, the service Svc2 is authorized to read the state variables of the temperature sensors of the installation No. 1234 and to use the «open» command on all rolling shutter-type actuators.

Thus, when the second service Svc2 will perform a reading or command request from Svc1 on a given resource Rc, the first service will be able to check in its access right repository Rf if the query can be authorized. Similarly, in the case where information relating to resources Rc under the monitoring of the first service Svc1 are updated, such as changes in value of the state variables S of the home automation devices D, these can be automatically retransmitted to the service Svc2 if the associated resource Rc is authorized for reading in the repository Rf.

In order to securely identify queries originating from the service Svc2, the service Svc1 can use an identification token Tk of the service Svc2.

This identification token Tk may have a permanent or limited validity, in which case it will have to be regularly renegotiated with the first service Svc1. This token will be stored in the repository Rf of the service Svc1 to perform the correspondence with the authorizations on the resource.

Thus, a service Svc2, approved by a user Usr1 associated with a home automation installation Su managed by the service Svc1 and containing a device D1, shall provide the identification token Tk associated with this installation in its query to the service Svc1. Table 2 hereinbelow gives an example of a second data structure of the repository Rf.

TABLE 2

Example of a second data structure of the repository Rf

| Second Service Svc2 | Token |
|---|---|
| Svc2a | Tka |
| Svc2b | Tkb |

The identification token for a second service may be invalidated by the first service if there is no longer any agreement between the first entity monitoring the first service and the second entity monitoring the second service or else if the user deletes his authorization to the second service. It is also possible that the token is invalidated after a predetermined period if the token is not renewed.

For example, the repository may be constituted by a database or a directory service. This repository may be included in the first service Svc1 or external and accessible by the first service Svc1. According to an alternative or complementary embodiment, the access right repository may use calculation algorithms taking as input information on the device, the state variable and the second service (type, identifier and value) and outputting a Boolean result in return indicating whether access is authorized.

Access Rules Definition Repository

In order to define the access rights contained in the access right repository Rf, the first service can use an access rules definition repository Rf0, which may be included in the access right repository or distinct therefrom, but accessible by the first service Svc1. The use of this repository Rf0 for defining access rules will be detailed with reference to the second implementation of a configuration method hereinbelow.

The access rules definition repository Rf0 comprises associations between a type of home automation device DT, at least one second service Svc2 and optionally access or filtering rules. Thus, the first service Svc1 can determine a second service associated with the home automation device D1 for which a remote access must be configured with corresponding access or filtering rules. The authorization type given to a second service Svc2 may be defined according to rules established between the first entity monitoring the first service Svc1 and the second entity monitoring the second service Svc2. An example of access rules definition table contained in the access rules definition repository Rf0 is represented hereinbelow in Table 3.

TABLE 3

Example of access rules definition table

| Device type DT | Second service | Authorized Actions |
|---|---|---|
| DT1 | Svc2_1 | READ/Temperature |
| DT2 | Svc2- | EXECUTE/Shutter Up/down |

Configuration Method

First Embodiment

Figure 4A:
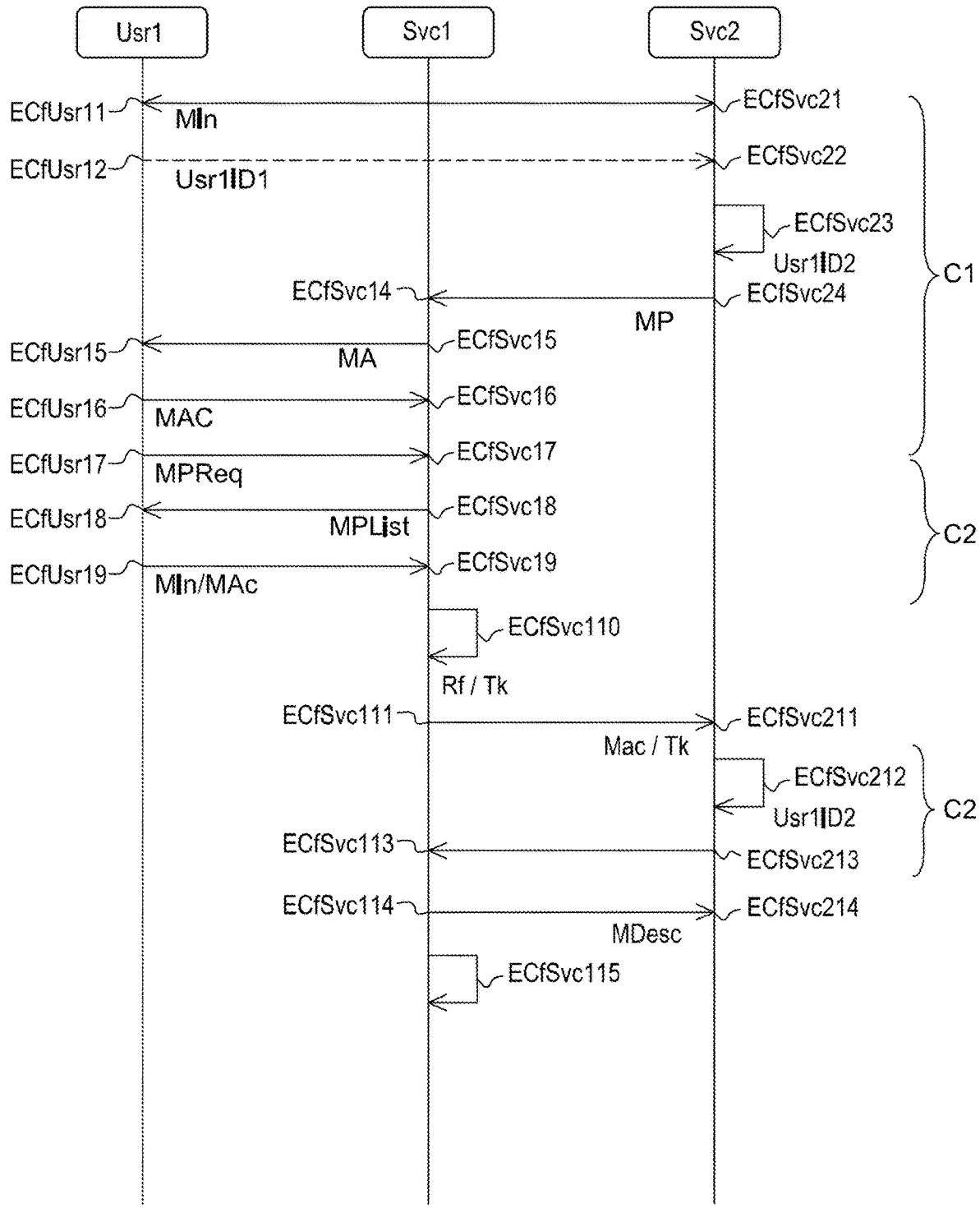
FIG. 4a is a diagram illustrating a first implementation of a method for configuring a remote access to at least one home automation device of a home automation installation.

We will now describe a method for configuring a remote access to at least one home automation device D belonging to a home automation installation Su with reference to FIG. 4a.

We assume that the user Usr1 has a user account for the service Svc1 with a corresponding identifier Usr1ID1.

According to a first scenario C1, the end user Usr1, via a user terminal T, requests a registration to the service Svc2 directly before the service Svc2.

In this case, at a step ECfUsr11, the end user Usr1 emits a registration request to the second service Svc2 which receives this request at a step ECfSvc21.

At a simultaneous or distinct step ECfUsr12, the end user also emits the identifier Usr1ID1, which identifies the user Usr1 before the first service Svc1, to the second service Svc2 which receives it at a step ECfsvc22.

At a step ECfsvc23, the second service Svc2 proceeds with the configuration or the creation of a profile or account for the user Usr1, with a corresponding identifier Usr1ID2. The second service also proceeds with the registration of a correspondence between an identifier Usr1ID1 of the user Usr1 on the first service, and the identifier Usr1ID2 of the user Usr1 on the second service Svc2.

At a step ECfsvc24, the second service Svc2 emits an access request MP to the first service Svc1 which receives it at a step ECfsvc14. The access request may identify the user Usr1 by the identifier Usr1ID1.

At a step ECfSvc15, the first service may request an approval or a confirmation of the approval of the access before the user Usr1, for example via his terminal T, which receives it at a step ECfUsr15.

At a step ECfUsr16, the user confirms his approval of the access in a response MAC which is received by the service Svc1 at a step ECfSvc16.

According to a second scenario C2, the end user Usr1, via a user terminal T requests registration to the second service Svc2 from the first service Svc1.

In this case, at a step ECfUsr17, the end user Usr1 emits a query MPreq in order to obtain a list of second services available and supported before the first service Svc1 which receives this request at a step ECfSvc27.

At a step ECfScv18, the first service Svc1 returns a response MPList containing a list of the available second services which is received by the user at a step ECfUsr18.

At a step ECfUsr19, the end user Usr1 selects a partner service and emits a registration and approval request Min/Mac before the first service Svc1 which receives this request which corresponds to an access request for the second service Svc2 and to an authorization at a step ECfSvc19.

The approval of this partner service may be global for a given installation related to the user account of the user Usr1, or may only concern a group of devices or a particular home automation device D. In the same manner, this registration may concern all state variables or commands of a device or concern a subset of the state variables or of the commands of a concerned device depending on a filtering. For example, in the case of a second service Svc2 aiming at proposing an energy optimization, only the reading of the values of the state variables S relating to home automation devices D corresponding to temperature sensors or consumption sensors and/or the command C of a heating mode (eco, comfort) of the installation may be authorized for the service Svc2. The consultation of the state variables or the triggering of the command concerning the other home automation devices of the installation such as the lamps, shutters or access doors to the home or garage, for example, will not be authorized to the service Svc2 for security reasons.

Following the step ECfSvc16 in the first case C1 or the step ECfSvc19 in the second case C2, the first service proceeds with a configuration step ECfSvc110 to enable the approval of a control order from the second service Svc2 or for sending supervision data to the second service Svc2. In particular, the first service Svc1 configures an access right repository Rf. The structure of this repository has been previously described. The first service Svc1 therefore configures the repository Rf in accordance with the access request received and approved by the user for given resources RC in order to obtain for example a structure as described in Table 1. The authorization type given to a second service Svc2 may be defined according to rules established between the first entity monitoring the first service Svc1 and the second entity monitoring the second service Svc2.

During the configuration step, an identification token Tk may also be generated for the second service Svc2 and stored in the repository Rf. The token may be communicated to the service Svc2 at a later stage. The communication of the token between the service1 and the service2 may be carried out via the user terminal.

At a step ECfSvc111, the first service Svc1 emits an approval/registration message to the second service Svc2 which is received by the second service at a step ECfsvc11. The identification token Tk may be communicated for example during this step or during a distinct step.

In the second case C2, at a step ECfsvc212, the second service Svc2 proceeds with the configuration or the creation of a profile or account for the user Usr1, with a corresponding identifier Usr1ID2, and can record the correspondence between the identifier Usr1ID1 of the user Usr1 on the first service, and the identifier Usr1ID2 of the user Usr1 on the second service. The second service can also store the identification token Tk.

In the second case C2, at a step ECfSvc213, the second service Svc2 then communicates a confirmation of the creation of the user account and optionally the created identifier Usr1ID2.

In the first case C1 and the second case C2, at a step ECfSvc114, the first service Svc1 can transmit a description MDesc, or a filtered view of the installation or a group of home automation devices D comprising at least one device, to the second service Svc2, which receives it at a step ECfsvc214.

According to an additional step ECfSvc115, the second service Svc2 may be registered as a subscriber to events concerning the at least one device D concerned by the remote access.

Second Mode of Implementation

Figure 4B:
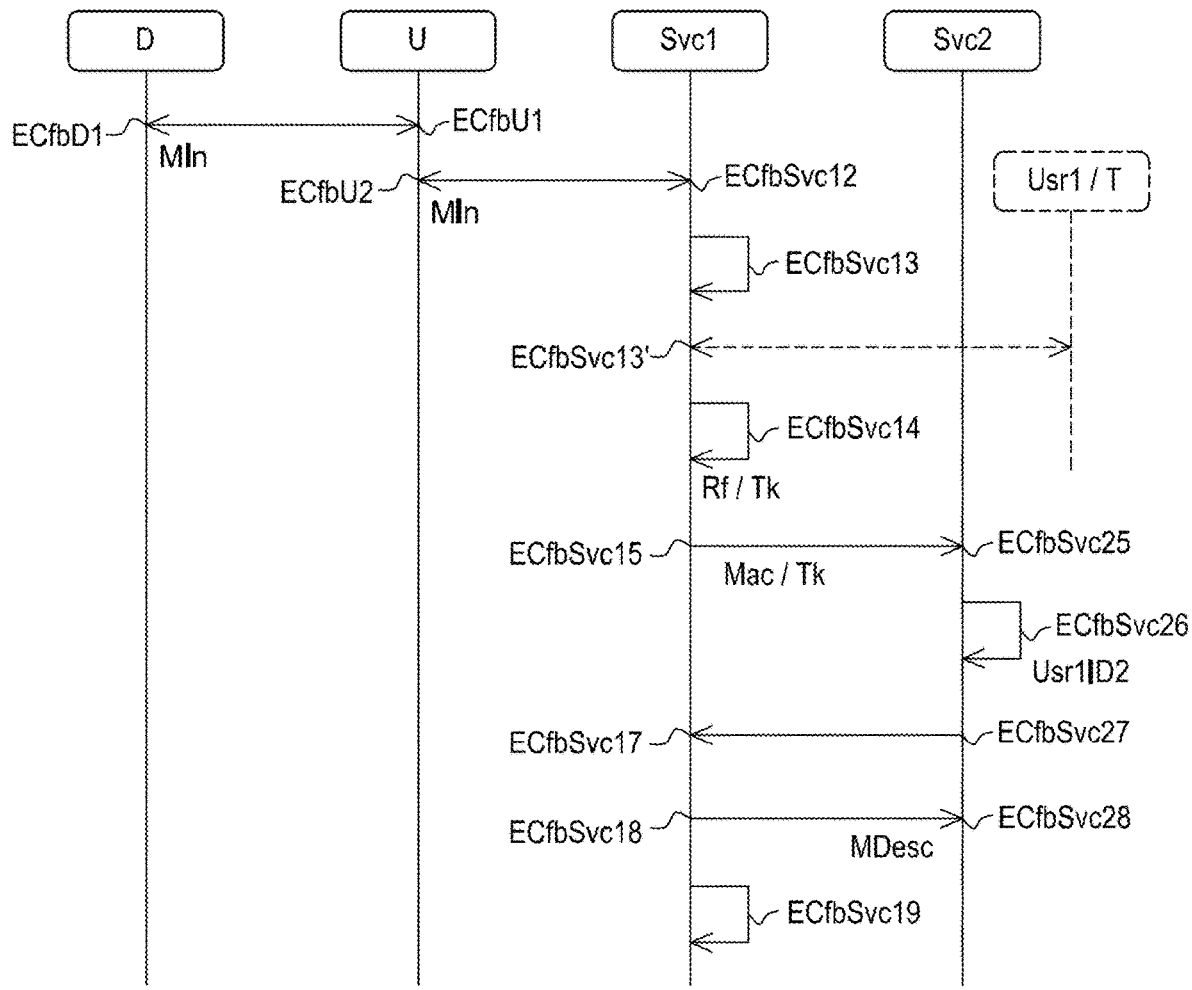
FIG. 4b is a diagram illustrating a second implementation of a method for configuring a remote access to at least one home automation device of a home automation installation.

We will now describe a method for configuring a remote access to at least one home automation device D belonging to a home automation installation Su with reference to FIG. 4b.

We assume that the user Usr1 has a user account for the service Svc1 with a corresponding identifier Usr1ID1.

The user Usr1 or an installer proceeds with the installation of a device D1 in his home automation installation Su and with the pairing of this home automation device D1 with a central control unit U present in the installation which corresponds to an exchange of information constituting steps EcfbD1 and EcfbU1 respectively. Alternatively, the exchange of information may correspond to the installation of a central control unit U and the discovery by this central control unit U of a previously installed home automation device D. This event corresponds to the establishment of a connection via the network R1 between the central control unit U and the home automation device D.

The central control unit U then proceeds at a step EcfbU2 with the sending of an information message concerning the presence or the discovery of the home automation device D1 to a management unit Sv which receives this message at a step EcfbSvc12.

At a step EcfbSvc13, the first service Svc1 consults the access rules definition repository Rf0 in order to determine whether there is a second service associated with the type of the home automation device D1 for which a remote access must be configured with corresponding filtering or action rules. We will herein assume that such a service is defined.

Optionally, the first service can request at a step EcfbSvc13' an authorization before the end user Usr1, via a user terminal T, prior to the configuration of the remote access, and condition the configuration of the access by a positive response from the user.

The access for the second partner service may be global for a given installation related to the user account of the user Usr1, or only concern a group of devices or a particular home automation device D. Similarly, the access may concern all state variables or commands of a device, or concern a subset of the state variables or of the commands of a concerned device depending on a filtering. For example, in the case of a second service Svc2 aiming at proposing an energy optimization, only the reading of the values of the state variables S relating to the home automation devices D corresponding to temperature sensors or consumption sensors and/or the command C of a heating mode (eco, comfort) of the installation can be authorized for the service Svc2. The consultation of the state variables or the command triggering concerning the other home automation devices of the installation such as lamps, shutters or access doors to the home or garage, for example, will not be authorized to the service Svc2 for security reasons.

The first service Svc1 then proceeds with a configuration step EcfbSvc14 to enable the approval of a control order originating from the second Svc2 service or to send supervision data to the second service Svc2. In particular, the first service Svc1 configures an access right repository Rf. The structure of this repository has been previously described. The first service Svc1 therefore configures the repository Rf in accordance with the access request received and approved by the user for given resources Rc in order to obtain for example a structure as described in Table 1.

During the configuration step, an identification token Tk may also be generated for the second service Svc2 and stored in the repository Rf. The token may be communicated to the service Svc2 during a subsequent step.

At a step EcfbSvc15, the first service Svc1 emits an approval/registration message to the second service Svc2 which is received by the second service at a step Ecfbsvc25. The identification token Tk may be communicated for example during this step or during a distinct step. The message may contain information about the user Usr1 or its identifier Usr1ID1 of the user Usr1 on the first service. In the case where the first service has requested an authorization from the end user Usr1 via a user terminal T, the transmission of the approval/registration message may also be performed via said terminal T which will receive the message in response to its approval from Svc1 and return this message to the second service Svc2.

At a step Ecfbsvc26, the second service Svc2 proceeds with the configuration or the creation of a profile or account for the user Usr1, with a corresponding identifier Usr1ID2, and can record the correspondence between the identifier Usr1ID1 of the user Usr1 on the first service, and the identifier Usr1ID2 of the user Usr1 on the second service. The second service can also store the identification token Tk.

At a step EcfbSvc27, the second service Svc2 then communicates a confirmation of the creation of the user account and optionally the created identifier Usr1ID2.

At a step EcfbSvc18, the first service Svc1 can transmit a description MDesc, or a filtered view of the installation or a group of home automation devices D comprising at least one device, to the second service Svc2, which receives it at a step Ecfbsvc28.

According to an additional step EcfbSvc19, the second service Svc2 may be registered as a subscriber to events concerning the at least one device D concerned by the remote access.

Control Method

Figure 5:
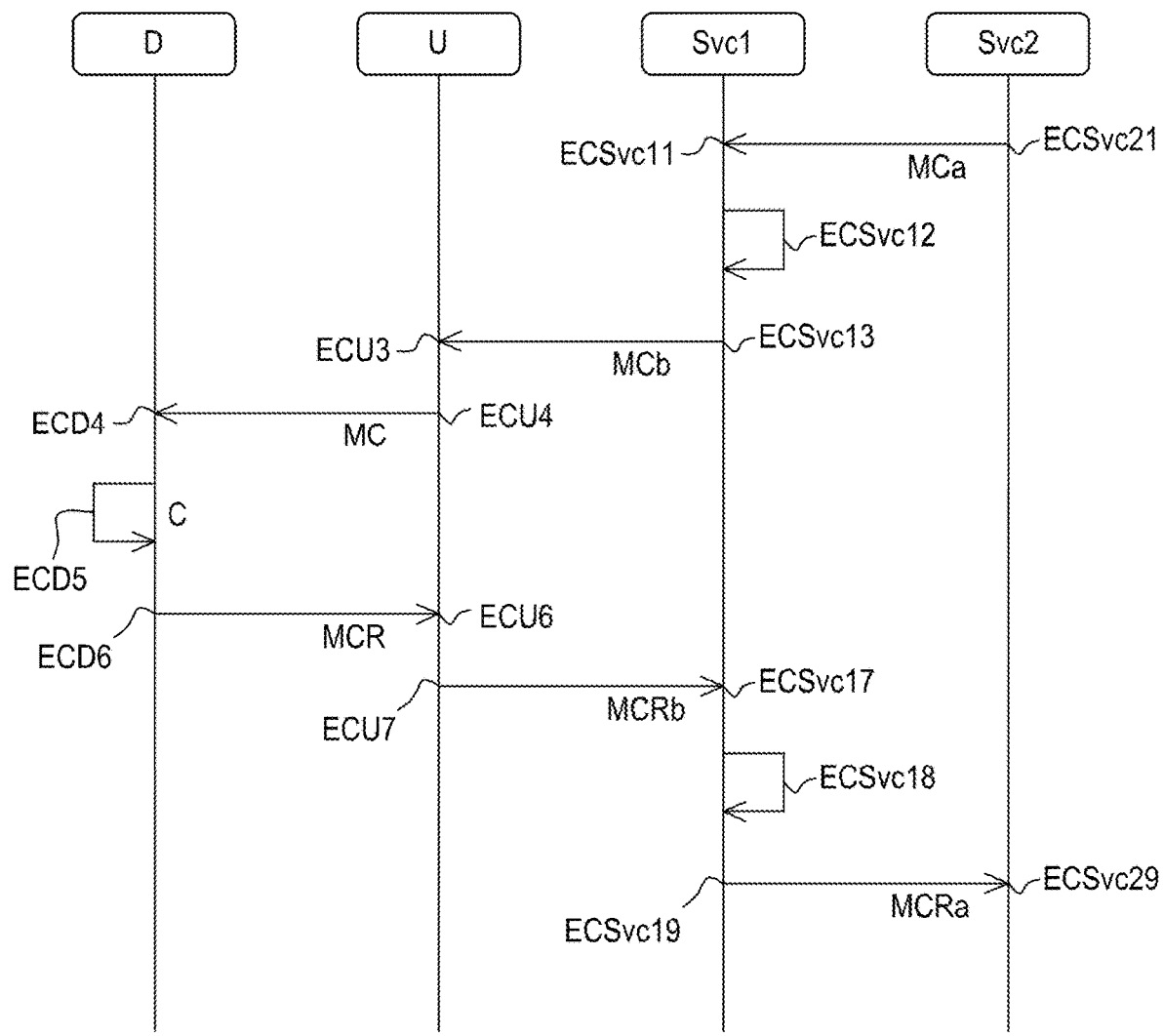
FIG. 5 is a diagram illustrating an implementation of a method for configuring a remote access to at least one home automation device of a home automation installation.

We will now describe a method for remotely controlling at least one home automation device D belonging to a home automation installation D with reference to FIG. 5. We herein assume that the steps of a configuration method have been carried out for example in accordance with what has been previously exposed with reference to FIG. 4a or 4b.

At a step ECSvc21, the second service Svc2 emits a control message MCa to the first service Svc1 which receives it at a step ECSvc11. This message concerns a home automation device D, and a command C to be carried out on this device. The message MCa also contains identification elements allowing validating that the request actually originates from an authorized second service Svc2, such as the identification token Tk obtained during the configuration method.

At a step ECSvc12, the service Svc1 operates a monitoring in order to check the identification of the second service Svc2, for example, based on the identification token. The service Svc1 then checks up whether a command requested in the message MCa by the service Svc2 is authorized, that is to say if it concerns a device D for which authorization has been given during the configuration, and/or if the concerned command or function is authorized for this device for the second service Svc2. In particular, this check-up is performed before the repository Rf.

At a step ECSvc13, in the case where the command C is authorized for the service Svc2, the first service Svc1 emits a control message MCb to a central control unit U to which the home automation device D concerned by the command C is related which receives it at a step ECU3. The format of this message may be distinct from that of the message MCa, a format conversion may be carried out by the first service.

At a step ECU4, the central control unit U emits a control message MC to the home automation device D concerned by the command C which receives it at a step ECD4. The format of this message may be distinct from that of the message MCb, a format conversion may be carried out by the central control unit U.

At a step ECD5, the home automation device D performs the command C.

At a step ECD6, the feedback code or the result of the command is communicated in a feedback message MCR by the device D to the central control unit U which receives it at a step ECU6.

At a step ECU7, the feedback code or the result of the command is communicated in a feedback message MCRb by the central control unit U to the first service Svc1 which receives it at a step ECSvc17. The format of this message may be distinct from that of the message MCR, a format conversion may be carried out by the first service Svc1.

At a step ECSvc18, the service Svc1 operates a check-up in order to determine whether the feedback code contained in the message MCRb can be transmitted to the service Svc2, in particular if the feedback code of the concerned command or function is authorized for this device for the service Svc2. This check-up is carried out before the repository Rf.

At a step ECSvc19, in the case where the feedback code or result can be communicated to the second service, the feedback code or the result of the command is communicated in a feedback message MCRa by the first service Svc1 to the second service Svc2 which receives it at a step ECSvc29. The format of this message may be distinct from that of the message MCRb, a format conversion may be carried out by the first service Svc1.

Supervision Method

Figure 6:
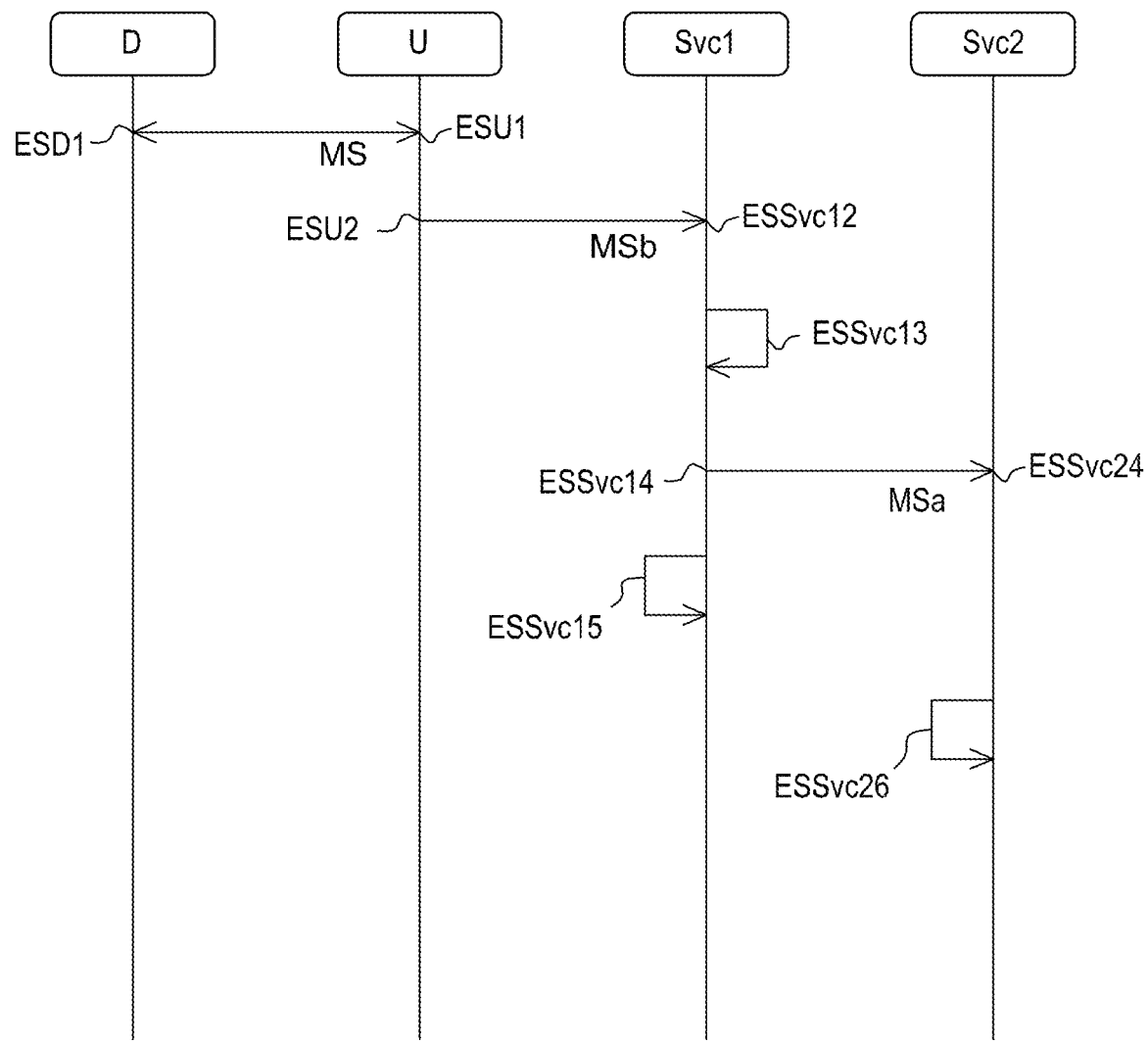
FIG. 6 is a diagram illustrating an implementation of a method for remotely supervising at least one home automation device of a home automation installation.

We will now describe a method for supervising at least one home automation device D belonging to a home automation installation Su with reference to FIG. 6. We herein assume that the steps of a configuration method have been carried out, for example, in accordance with what has been previously exposed with reference to FIG. 4a or 4b.

At a step ESD1, the home automation device D emits a supervision message MS corresponding to an event of change in value of a state variable S to the central control unit U to which the considered device D is related, the central control unit receiving this message at a step ESU1.

At a step ESU2, the central control unit U emits a supervision message MSb, which contains information concerning the event of change in value of the state variable S or translates them in a different format, so as to transmit them to the first service Svc1, which receives the message MSb at a step ESScv12.

According to one variant, in the case where the central control unit U is integrated in the device D, the constitution of the supervision message MSb may be carried out locally upon the detection of the triggering event corresponding to the change in value of a state variable.

According to another variant, in the case where the central control unit U is distinct from the device D, it is also possible that the device periodically sends messages MS and that it is the central control unit U which operates a check-up to identify changes in value. Finally, it is also possible that supervision messages MSb are sent without notice of any change in value.

At a step ESSvc13, the first service Svc1 determines whether a supervision message MSa should be sent to the second service. In particular, the service Svc1 operates a monitoring in order to check the identification of the second service Svc2, for example, based on a check-up of the validity of the identification token Tk. The first service Svc1 then checks whether there is a supervision authorization concerning the device D, that is to say if it concerns a device D for which an authorization has been given during the configuration and/or if the communication of supervision information concerning the concerned state variable S is authorized for this device for the service Svc2. In particular, this check-up is carried out before the repository Rf.

Thus, a filtering on a state variable S type can be carried out, or even a filtering on value ranges of the state variable S.

At a step ESSvc14, and to the extent that the first service Svc1 has determined that such a message MSa should be sent, the first service Svc1 emits a supervision message MSa to the second service Svc2, which receives the message at a step ESSvcs24.

In FIG. 6, the steps ESSvc14 and ESSvc24 feature a notification between the first service Svc1 and the second service Svc2 which corresponds to a direct sending. Nonetheless, it is possible that other mechanisms may be used.

In particular, according to a first variant, a queuing mechanism may be implemented, the messages may be stored by the first service on the queue and collected by the second service asynchronously.

Other push/pull type systems may also be used.

At a step ESSvc15, a local storage of information relating to the state variable may be carried out by the first service Svc1. It is possible that a filtering of the information is carried out at this stage. This configuration is in particular useful in the case where the device D is the property or under the monitoring of a second entity in charge of the second service Svc2, the first service Svc1 and possibly the central control unit, being under the monitoring of a first entity and acting as an intermediate infrastructure service. Thus, the first service Svc1 can serve as a communication channel between home automation devices D of a home automation installation Su and a second service Svc2 yet without being authorized to consult or keep the data that it ensures the transit thereof.

It should be noted that it is also possible that no storage is carried out.

At a step ESSvC26, a local storage of the information relating to the state variables S may be carried out by the second service Svc2.

The invention claimed is:

1. A method for configuring a remote access to at least one home automation device belonging to a home automation installation, the home automation installation comprising the at least one home automation device and at least one central control unit to which is connected the at least one home automation device, the home automation installation being accessible by a first remote access service executed by a management unit, the method being implemented by the first remote access service and comprising the following steps of:

receiving a request, from a user, for allowing a second remote access service to remotely access the at least one home automation device, the at least one home automation device being related to a profile of the user on the first remote access service, the request being related to an identifier of the user, the identifier identifying the user on the first remote access service;

sending, to the user or a user terminal, at least one message containing a list of available second remote access services:

receiving, from the user, an authorization allowing the second remote access service to remotely access the at least one home automation device, where the step of receiving, from the user, the authorization allowing the second remote access service to remotely access the at least one home automation device corresponds to a selection of the second remote access service in the list of available second remote access services contained in the at least one message; and configuring an access right repository to approve at least one command originating from the second remote access service or sending of supervision data to the second remote access service on behalf of the at least one home automation device related to the profile of the user.

2. The method according to claim 1, wherein the configuring step comprises a step of generating an identification token for the second remote access service.

3. The method according to claim 2, wherein the request is received from the second remote access service.

4. The method according to claim 3, comprising, prior to receiving the authorization allowing the second remote access service to remotely access the at least one home automation device,
- requesting an approval or a confirmation, from the user, of the request for.

5. The method according to claim 2, comprising the following step of:
- sending an approval/registration message to the second remote access service.

6. The method according to claim 1, wherein the request is received from the second remote access service.

7. The method according to claim 6, comprising, prior to receiving the authorization allowing the second remote access service to remotely access the at least one home automation device,
- requesting an approval or a confirmation, from the user, of the request.

8. The method according to claim 1, further comprising, prior to the step of sending, to the user or the user terminal, the at least one message containing the list of available second remote access services,
- receiving a query message originating from the user in order to obtain the list of available second remote access services from the first remote access service.

9. The method according to claim 1, comprising the following step of:
- sending an approval/registration message to the second remote access service.

10. The method according to claim 1, comprising the following step of:
- sending, to the second remote access service, at least one message for describing or transmitting a filtered view of the home automation installation or a group of home automation devices comprising the at least one home automation device.

11. A method for remotely controlling at least one home automation device belonging to a home automation installation, the home automation installation comprising the at least one home automation device and at least one central control unit to which is connected the at least one home automation device, the home automation installation being accessible by a first remote access service executed by a management unit, the method being implemented by the first remote access service and comprising the following steps of:
- receiving a request, from a user, for allowing a second remote access service to remotely access the at least one home automation device, the at least one home automation device being related to a profile of the user on the first remote access service, the request being related to an identifier of the user, said identifier identifying the user on the first remote access service;
- sending, to the user or a user terminal, at least one message containing a list of available second remote access services;
- receiving, from the user, an authorization allowing the second remote access service to remotely access the at least one home automation device, where the step of receiving, from the user, the authorization allowing the second remote access service to remotely access the at least one home automation device corresponds to a selection of the second remote access service in the list of available second remote access services contained in the at least one message;
- configuring an access right repository to approve at least one command originating from the second remote access service or sending of supervision data to the second remote access service on behalf of the at least one home automation device related to the profile of the user;
- receiving a control message originating from the second remote access service, the control message requesting at least one command to be carried out on the at least one home automation device;
- checking, with the access right repository authorization of the at least one command requested in the control message;
- in the case where the at least one command is authorized, sending the control message to the at least one central control unit to which is connected the at least one home automation device on which the at least one command is to be carried out.

12. The method according to claim 11, wherein:
the control message comprises an identification token;
the method further comprising
a step of checking, with the access right repository, a validity of the identification token for the second remote access service.

13. The method according to claim 11, further comprising the following steps of:
- receiving a feedback message originating from the at least one central control unit;
- checking, with the access right repository, authorization for sending the feedback message to the second remote access service;
- in the case where sending the feedback message is authorized, sending the feedback message to the second remote access service.

14. A method for remotely supervising at least one home automation device belonging to a home automation installation, the home automation installation comprising the at least one home automation device and at least one central control unit to which is connected the at least one home automation device, the home automation installation being accessible by a first remote access service executed by a management unit, the method being implemented by the first remote access service and comprising the following steps of:
- receiving a request, from a user, for allowing a second remote access service to remotely access the at least one home automation device, the at least one home automation device being related to a profile of the user on the first remote access service, the request being related to an identifier of the user, said identifier identifying the user on the first remote access service;
- sending, to the user or a user terminal, at least one message containing a list of available second remote access services;
- receiving, from the user, an authorization allowing the second remote access service to remotely access the at least one home automation device, where the step of receiving, from the user, the authorization allowing the second remote access service to remotely access the at least one home automation device corresponds to a selection of the second remote access service in the list of available second remote access services contained in the at least one message;
- configuring an access right repository to approve at least one command originating from the second remote access service or sending of supervision data to the second remote access service on behalf of the at least one home automation device related to the profile of the user;

receiving a supervision message originating from the at least one central control unit comprising information concerning at least one state variable of the at least one home automation device;

checking, with the access right repository, authorization for sending the supervision message;

in the case where the sending of the supervision message is authorized, sending the supervision message to the second remote access service.

15. The method according to claim 14, further comprising the following step of:

storing information relating to at least one state variable by the first remote access service.

* * * * *